United States Patent [19]

Ercole et al.

[11] 3,735,936
[45] May 29, 1973

[54] WEB SEPARATING DEVICE
[75] Inventors: Anthony C. D. Ercole; David N. Schwardt, both of Rochester, N.Y.
[73] Assignee: Eastman Kodak Company, Rochester, N.Y.
[22] Filed: July 29, 1971
[21] Appl. No.: 167,195

[52] U.S. Cl. ..................... 242/71.1, 95/90.5, 242/55
[51] Int. Cl. ............................................. G03b 23/04
[58] Field of Search ...................... 242/71, 71.1, 71.2, 242/71.7; 95/90.5

[56] References Cited
UNITED STATES PATENTS

| | | | |
|---|---|---|---|
| 2,692,541 | 10/1954 | Lesjak | 95/90.5 |
| 2,693,138 | 11/1954 | Lesjak | 95/90.5 |
| 2,562,877 | 8/1951 | Balluff | 95/90.5 |
| 2,555,202 | 5/1951 | Ormond | 95/90.5 |

Primary Examiner—George F. Mautz
Assistant Examiner—Edward J. McCarthy
Attorney—W. H. J. Kline and Roger A. Fields

[57] ABSTRACT

An enclosure is adapted to receive a cartridge in which first and second webs are wound in substantially contiguous relation on a common core, the cartridge being provided with an opening through which such webs can be advanced. The enclosure includes a wall member in which a web egress slot is disposed and a projecting member which is engageable with a corresponding member of the cartridge. When so engaged, the cartridge will be oriented within the enclosure in a manner such that if the first and second webs are advanced from the cartridge opening, the first web will be positioned for movement through the web egress slot, and the second web will be positioned to abut against the wall member of the enclosure and thus separate from the first web upon movement of the first web through the web egress slot. The periphery of the web egress slot is shaped to support the opposed edges of the first web while maintaining a spaced relation with at least one of the web faces. To facilitate insertion of a free leading end of the first web into the web egress slot, the wall member includes an open-ended guideway which communicates with the slot so that such web end can be readily directed into the slot.

7 Claims, 6 Drawing Figures

Patented May 29, 1973 3,735,936
2 Sheets-Sheet 1
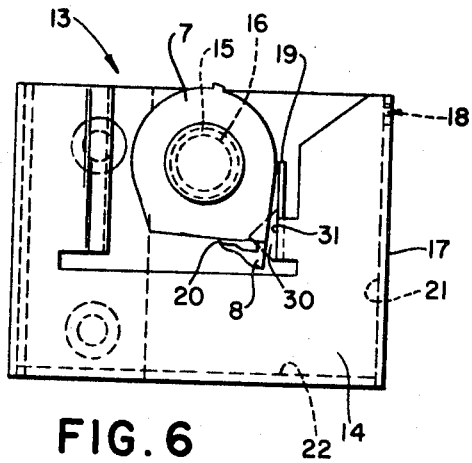
FIG. 6
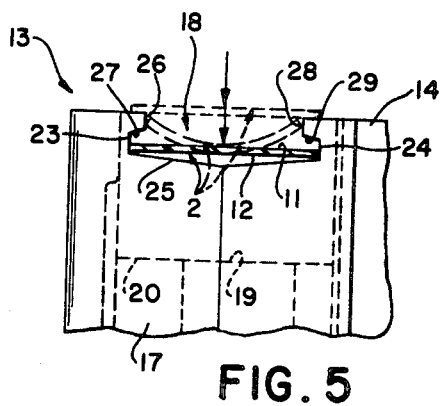
FIG. 5
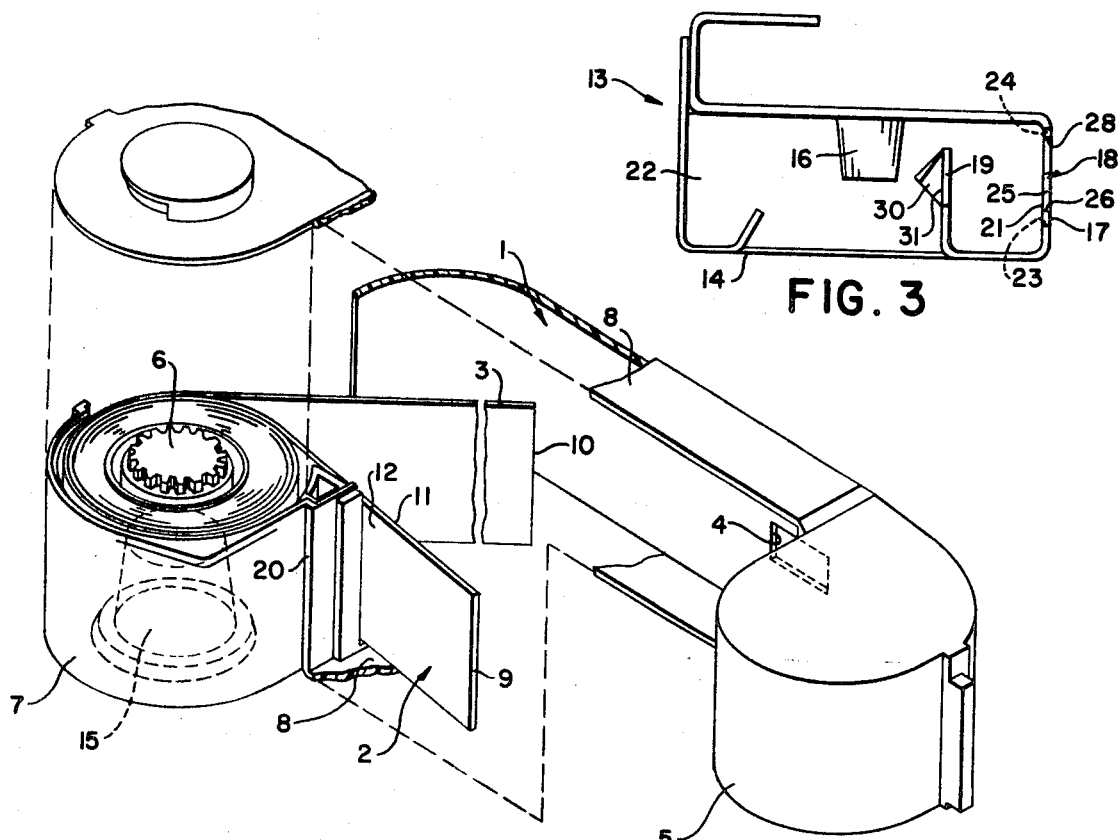
FIG. 3
FIG. 1
ANTHONY C. D'ERCOLE
DAVID N. SCHWARDT
INVENTORS
BY Roger A. Fields
W. H. J. Kline
ATTORNEYS Patented May 29, 1973

ANTHONY C. D'ERCOLE
DAVID N. SCHWARDT
INVENTORS

BY Roger A. Fields

H.H.J. Kline

ATTORNEYS

WEB SEPARATING DEVICE

CROSS REFERENCE TO RELATED APPLICATIONS

Reference is made to commonly assigned copending U.S. Pat. application, Ser. No. 25,848, entitled Film Cartridge And Photographic Apparatus Using Same, and filed in the name of Evan A. Edwards on April 6, 1970 now U.S. Pat. No. 3,684,206.

BACKGROUND OF THE INVENTION

1. Field of the Invention

The present invention relates to a device for separating two or more webs, such as a photographic filmstrip and a radiation protective backing web, which are disposed in substantially contiguous relation. More particularly, this invention relates to a web separating device wherein the contiguously disposed webs, to be separated, are wound on a common core within a cartridge.

2. Description of the Prior Art

Apparatus has heretofore been devised for separating two contiguously disposed webs which are wound together on a common core so as to effect a web roll. Known apparatus of this kind, such as the device disclosed in U.S. Pat. No. 751,553, generally includes an enclosure which is adapted to receive the web roll and in which the web roll is intended to be rotatably supported. The enclosure is provided with a web egress slot or opening through which a first of the webs may be advanced upon unwinding from a web roll supported in the enclosure. The second or remaining web is either collected within the enclosure or diverted elsewhere by a suitable guide member of the enclosure.

In the field of photographic filmstrip handling, web separating devices substantially of the foregoing configuration are particularly suited for separating an exposed filmstrip on which is recorded a latent image and a paper backing web which is contiguously disposed along the base side of such filmstrip to shield the filmstrip from unintentional exposure to light. Here, the two webs are wound together on a common core so as to effect a web roll which comprises successive, alternate convolutions of filmstrip and backing web. However, in this instance, since the web roll is best handled in a darkened environment to minimize the possibility of unintentional exposure, difficulty will be encountered in orienting a free leading end of the filmstrip for insertion into the web egress slot should the web roll be rotatably supported in the enclosure. Moreover, since the web egress slot is generally of cross-sectional dimensions slightly greater than the corresponding dimensions of the filmstrip, difficulty will be encountered in inserting the leading filmstrip end into such slot without the presence of visually assisting light. One further problem resulting from the dimensions and shape of the web egress slot in web separating devices previously known, is the undesired tendency of the edges of such slot to scratch the emulsion side of the filmstrip as the filmstrip is advanced through the slot.

It will therefore be appreciated, in view of the foregoing difficulties encountered with respect to previously known web separating devices, that there exists a definite need for an improved version of such a device.

Recently, there has been devised a cartridge in which a filmstrip and a radiation protective backing web are wound together on a common core so as to effect a web roll comprising successive, alternate convolutions of filmstrip and backing web. An example of such a cartridge is disclosed in commonly assigned copending U.S. Pat. application, Ser. No. 25,848. To process or develop a filmstrip on which a latent image has been recorded, the filmstrip and backing web are removed from the cartridge, and preferably separated. The filmstrip is then advanced to a suitable processing apparatus. It will be appreciated, in this instance, that a web separating device similar to the kind described hereinbefore could be used to achieve separation of the filmstrip and backing web. However, the difficulties encountered with respect to such prior art devices would similarly present a problem here.

SUMMARY OF THE INVENTION

It is therefore an object of the present invention to provide a web separating device which is improved so as to avoid the foregoing difficulties encountered with respect to those devices previously known.

Another object of the present invention is to provide an improved web separating device which is adapted for use with a cartridge in which at least two contiguously disposed webs are wound on a common core.

In accordance with a preferred embodiment of the present invention, there is disclosed hereinafter an enclosure adapted to receive a cartridge in which first and second webs are wound in substantially contiguous relation on a common core. The cartridge is provided with an opening through which the first and second webs can be advanced. The enclosure includes a wall member in which a web egress slot is disposed and a projecting member which is engageable with a corresponding member of the cartridge. When so engaged, the cartridge will be oriented within the enclosure in a manner such that if the first and second webs are advanced from the cartridge opening, the first web will be positioned for movement through the web egress slot, and the second web will be positioned to abut against the wall member of the enclosure and thus separate from the first web upon movement of the first web through the web egress slot. The periphery of the web egress slot is shaped to support the opposed edges of the first web while maintaining a spaced relation with at least one of the web faces. Accordingly, at least one face of the first web is prevented from abutting against, and possibly being scratched, by the edges of the web egress slot upon movement of such web through the slot. To facilitate insertion of a free leading end of the first web into the web egress slot, the wall member includes an open-ended guideway which communicates with the slot so that such web end can be readily directed into the slot.

BRIEF DESCRIPTION OF THE DRAWINGS

The above-mentioned and other features and objects of the present invention and the manner of obtaining them will become more apparent by reference to the following detailed description of the preferred embodiment of such invention taken in conjunction with the accompanying drawings wherein:

FIG. 1 is a perspective bottom view of a cartridge of the kind disclosed in commonly assigned copending U.S. Pat. application, Ser. No. 25,848, showing the cartridge broken apart for the purpose of removing a web roll comprising a filmstrip and a radiation protective backing web;

FIG. 3 is a top plan view of the web separating device as depicted in FIG. 2;

FIG. 5 is a side elevation view of the web separating device as depicted in FIG. 4, showing the manner in which a free leading end portion of the filmstrip is inserted in a web egress slot of the web separating device; and FIG. 6 is a cross-sectional elevation view of the web separating device and the take-up chamber of the cartridge, showing the manner in which the web separating device is adapted to prevent improper receipt of such chamber.

DESCRIPTION OF THE PREFERRED EMBODIMENT

Figure 2:
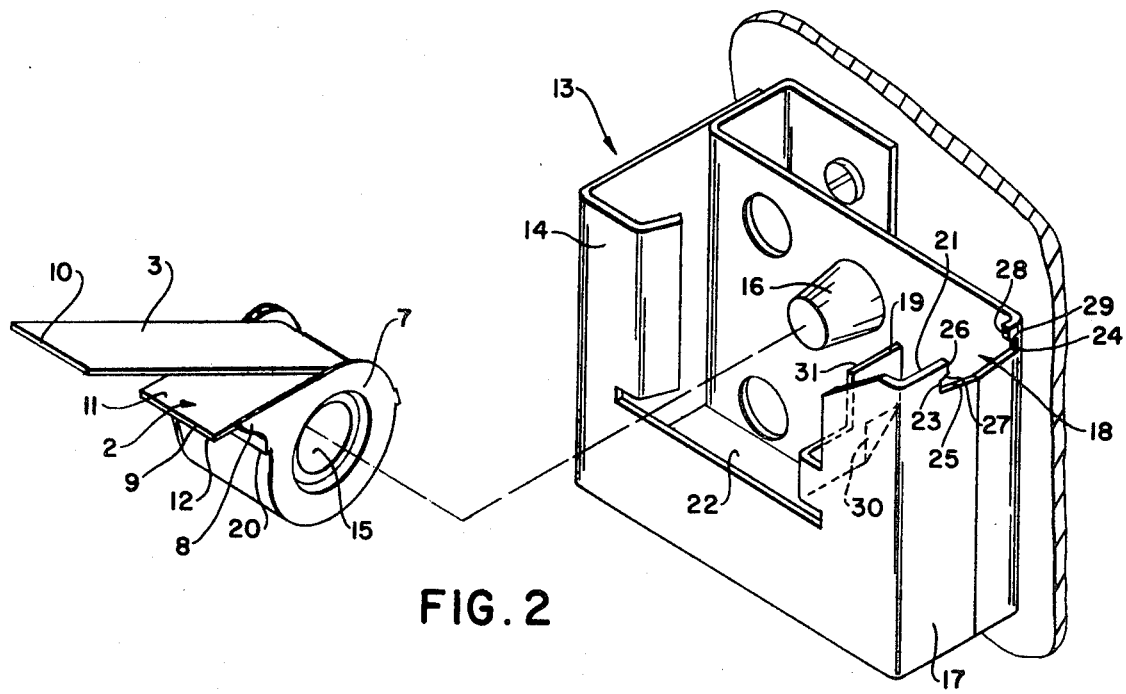
FIG. 2 is a perspective front view of a web separating device, according to a preferred embodiment of the present invention, and a take-up chamber of the cartridge depicted in FIG. 1.

Before proceeding with the description of the web separating device per se, it may be well to first consider a cartridge with which such device is adapted to be used. Such a cartridge 1, though more fully disclosed in commonly assigned co-pending U.S. Pat. application, Ser. No. 25,848, is illustrated in FIG. 1. Briefly stated, this cartridge 1 is provided with a contiguously disposed filmstrip 2 and paper backing web 3 which are wound together in a convoluted manner, within the cartridge, such that successive convolutions are alternately formed by filmstrip and backing web portions. The filmstrip 2 is not attached to the backing web 3 but rather is simply in frictional contact with such web. Since the backing web 3 is intended to shield the the filmstrip 2 from unintentional exposure to light via a rectangular aperture 4 in the cartridge 1, the filmstrip and the backing web are wound so that the outermost convolution is formed by a backing web portion.

When the cartridge 1 is first loaded into a camera (not shown) a substantial length of the filmstrip 2 and a corresponding length of paper backing web 3 are wound together in a supply chamber 5 of the cartridge, with leading portions of the filmstrip and the backing web secured about a winding core 6 rotatably supported within a take-up chamber 7 of the cartridge. Upon rotation of the winding core 6, the filmstrip 2 and the backing web 3 will be simultaneously drawn out of the supply chamber 5, through an intermediate guide chamber 8, and thence into the take-up chamber 7. Accordingly, a web roll comprising successive alternate convolutions of the filmstrip 2 and the backing web 3 will be formed about the winding core 6, with the outermost convolution being formed by a backing web portion. If the cartridge 1 should now be broken apart or severed, by any suitable mechanism, transversely across the intermediate guide chamber 8 so as to separate the supply and take-up chambers 5 and 7 in the manner shown in FIG. 1, it will then be possible to draw the filmstrip 2 and the backing web 3 (by their respective free leading end portions 9 and 10) simultaneously off the winding core 6 and out of the take-up chamber.

As can best be seen in FIG. 1, the filmstrip 2 is of the kind provided with a base side or face 11 and with an emulsion side or face 12. The base side 11 of the filmstrip 2 generally exerts less of a frictional force on a convolution of the paper backing web 3 than the frictional force exerted by the emulsion side 12 of the filmstrip on the same convolution. This is so because the base side 11 is relatively smoother than the emulsion side 12 and because of the clock-spring tendency of the filmstrip 2, when wound, to move the next inwardly succeeding convolution of the backing web 3 into abutment against the emulsion side. Therefore, upon drawing the filmstrip 2 and the backing web 3 out of the take-up chamber 7, the convolution of backing web which is located immediately inward of the outermost convolution of filmstrip will form a loop 3', schematically illustrated in FIG. 4. The significance of this last-mentioned feature will become apparent hereinafter with respect to the description of a preferred embodiment of the web separating device.

Figure 4:
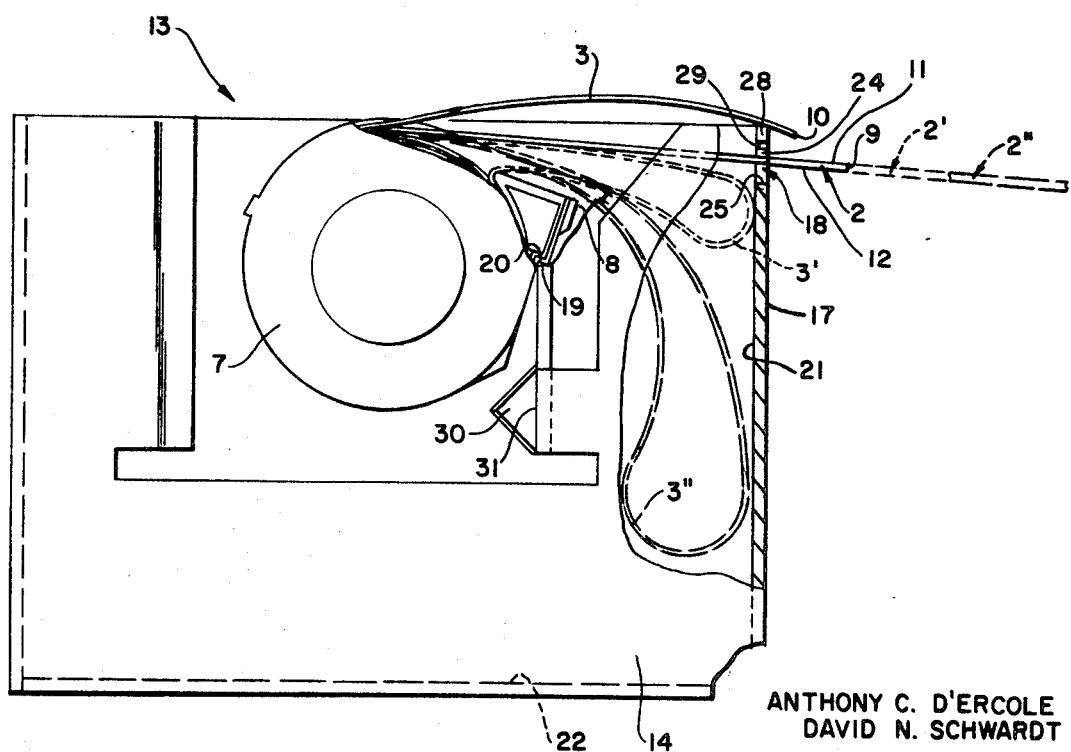
FIG. 4 is a cross-sectional elevation view of the web separating device and the take-up chamber of the cartridge, showing such chamber supported in the web separating device and the manner in which the filmstrip and the backing web are separated.

Considering now a preferred embodiment of the web separating device, there is shown in FIGS. 2 and 3, a web separating device generally designated by the reference number 13. This device comprises a box-like enclosure 14 which is adapted to receive the take-up chamber 7 of the cartridge 1, including the commonly wound filmstrip 2 and paper backing web 3 (see FIG. 2). The take-up chamber 7 is provided with a recess 15 in which a spindle member 16 of the enclosure 14 can be located for rotatably supporting the take-up chamber within the enclosure. The enclosure 14 includes a wall member 17, in which a web egress slot 18 is disposed, and a projecting or tab member 19, which is engageable with an exterior lip member 20 of the take-up chamber 7. When the tab and lip members 19 and 20 are engaged, the take-up chamber 7 will be prevented from rotating within the enclosure 14 in a clockwise direction as viewed in FIG. 4. Moreover, the take-up chamber 7 will be oriented with respect to the web egress slot 18 in a manner such that if the filmstrip 2 and the backing web 3 are advanced from the take-up chamber, and the free leading end portion 9 of the filmstrip 2 is then moved through the web egress slot, the free leading end portion 10 of the backing web 3 will overlap the wall member 17 as shown in FIG. 4. Upon drawing a length 2' of the filmstrip 2 outwardly through the web egress slot 18, a loop 3' of the backing web 3 will be effected, as schematically illustrated in FIG. 4, for the reasons adequately described hereinbefore. This loop 3' will abut against a web guide surface 21 of the wall member 17 and thus separate from the filmstrip 2. Upon drawing a further length 2'' of the filmstrip 2 outwardly through the web egress slot 18, the loop 3' will be enlarged so as to form a loop 3'' and will be guided along the web guide surface 21 toward the bottom 22 of the enclosure 14. In this manner, the filmstrip 2 and the backing web 3 will be completely separated, the backing web either collecting within the bottom 22 of the enclosure or, if such bottom is open (not shown), passing from the enclosure into an appropriate receptacle (not shown).

It will be appreciated, from FIG. 4, that the tab member 19 of the web separating device 13 and the lip member 20 of the take-up chamber 7 are adapted for engagement when such chamber is oriented, within the enclosure 14, to position the free leading end portion 9 of the filmstrip 2 for insertion into the web egress slot 18. This last-mentioned feature is especially useful in situations where a latent image is recorded on the filmstrip 2, so that the take-up chamber 7 would be best handled in a darkened environment to minimize the possibility of unintentional exposure of the filmstrip to light.

As can be seen in FIG. 5, the periphery of the web egress slot 18 is adapted to provide support for the longitudinal opposed edges of the filmstrip 2 while maintaining a spaced relation with the base and emulsion sides 11 and 12 of the filmstrip. More specifically, the web egress slot 18 comprises two spaced opposed edges or surfaces 23 and 24 and an interconnecting V-shaped edge or surface 25. The two slot edges 23 and 24 serve to support, in a guiding manner, the longitudinal opposed edges of the filmstrip 2, while the particular shape or outline of the web egress slot 18 effects a spaced relation between such slot and the base and emulsion sides 11 and 12 of the filmstrip 2. Accordingly, the emulsion side 12 of the filmstrip 2 is prevented from abutting against, and possibly being scratched by, the web egress slot 18 upon movement of the filmstrip through such slot.

To facilitate insertion of the free leading end portion 9 of the filmstrip 2 into the web egress slot 18 as schematically illustrated in FIG. 5, the wall member 17 of the enclosure 13 includes an open-ended guideway which is defined by angularly disposed surfaces 26,27 and 28, 29 and which communicates with the web egress slot. In particular, the surfaces 26 and 27 connect with the edge 23 of the web egress slot 18 and the surfaces 28 and 29 connect with the edge 24 of such slot, so as to provide a means for readily directing the free leading end portion 9 of the filmstrip 2 into the web egress slot.

Referring now to FIGS. 2, 3 and 6, there is shown a backstop 30 which angularly extends from a guide wall 31 of the enclosure 14. As can be appreciated from FIG. 2, the guide wall 31 serves to direct the take-up chamber 7 onto the spindle member 16. Whereas, the backstop 30 is adapted to prevent substantial receipt of the take-up chamber 7 on the spindle member 16 should an attempt be made to incorrectly position such chamber on the spindle member in the manner shown in FIG. 6.

It will now be appreciated by those having ordinary skill in the art that the web separating device 13, according to a preferred embodiment of the present invention, avoids the specific difficulties described hereinbefore which are encountered with respect to those devices previously known.

Although the web separating device 13 has been considered for use with the filmstrip 2 and the paper backing web 3, it will of course be appreciated that such device can be similarly used with other kinds of web or strip material.

The present invention has been described in considerable detail with particular reference to a preferred embodiment thereof, but it will be understood that variations and modifications can be effected within the spirit and scope of the invention.

We claim:

1. A device for separating first and second webs which are wound in substantially contiguous relation on a common core within a cartridge, wherein the cartridge is provided with an opening through which the first and second webs can be advanced and with an engageable member, said web separating device comprising:
an enclosure adapted to receive such a cartridge with first and second webs;
said enclosure including:
a. a wall member;
b. means defining a web egress slot in said wall member;
c. a web guide surface disposed within said enclosure, along said wall member, at a location substantially adjacent said web egress slot;
d. means for supporting such a cartridge with first and second webs within said enclosure;
e. means, engageable with the engageable member of a cartridge so supported, for orienting the cartridge opening with respect to said web egress slot in a manner such that should first and second webs be advanced from the supported cartridge, the first web will be positioned for movement through said slot, and the second web will be positioned to abut against said web guide surface and thus separate from the first web upon movement of the first web through said slot.

2. A web separating device as recited in claim 1, wherein the engageable member of such a cartridge with first and second webs includes an exterior lip member, and wherein said orienting means includes:
a tab member disposed within said enclosure and adapted to engage the lip member of a supported cartridge upon orientation of the cartridge opening, with respect to said web egress slot, for separation of the first and second webs.

3. A web separating device as recited in claim 1, wherein the first web is provided with two opposed edges and with two opposed faces which extend between such edges, and wherein said web egress slot defining means includes:
surface defining means for supporting, in a guiding manner, the two edges of such a first web and for effecting a spaced relation between said web egress slot defining means and at least one of the two faces of a first web so supported.

4. A web separating device as recited in claim 1, wherein the first web is provided with a free leading end, and wherein said enclosure further includes:
means defining an open-ended guideway, disposed along said wall member and communicating with said web egress slot defining means, for directing the free leading end of such a first web into said slot.

5. A device for separating first and second contiguously disposed webs which are wound together in a convoluted manner within a cartridge such that successive convolutions are alternately formed by first and second web portions, wherein the cartridge is provided with an opening through which the first and second webs can be advanced and with an engageable member, said web separating device comprising:
an enclosure adapted to receive such a cartridge with first and second webs;
said enclosure including:
a. a wall member;
b. means defining a web egress slot in said wall member;
c. a web guide surface disposed within said enclosure, along said wall member, at a location substantially adjacent said web egress slot;

d. means for supporting such a cartridge with first and second webs, in a rotatable manner, within said enclosure; and e. means, engageable with the engageable member of a cartridge so supported, for preventing rotation of the supported cartridge in a predetermined direction and for orienting the cartridge opening with respect to said web egress slot in a manner such that should first and second webs be advanced from the supported cartridge, the first web will be positioned for movement through said slot, and the second web will be positioned to abut against said web guide surface and thus separate from the first web upon movement of the first web through said slot.

6. A web separating device as recited in claim 5, wherein the first web is provided with two opposed edges and with two opposed faces which extend between such edges, and wherein said web egress slot defining means includes:

means defining two spaced opposed surfaces for respectively supporting, in a guiding manner, the two edges of such a first web; and means defining a surface which extends between said two surfaces, in a relative configuration, so as to be spaced from the two faces of such a supported first web.

7. A web separating device as recited in claim 6, wherein the first web is further provided with a free leading end, and wherein said enclosure further includes:

means defining an open-ended guideway, disposed along said wall member and communicating with said two surfaces of said web egress slot defining means, for directing the free leading end of such a first web into said slot to effect support of the two web edges respectively by said two surfaces.

* * * * *